UNITED STATES PATENT OFFICE.

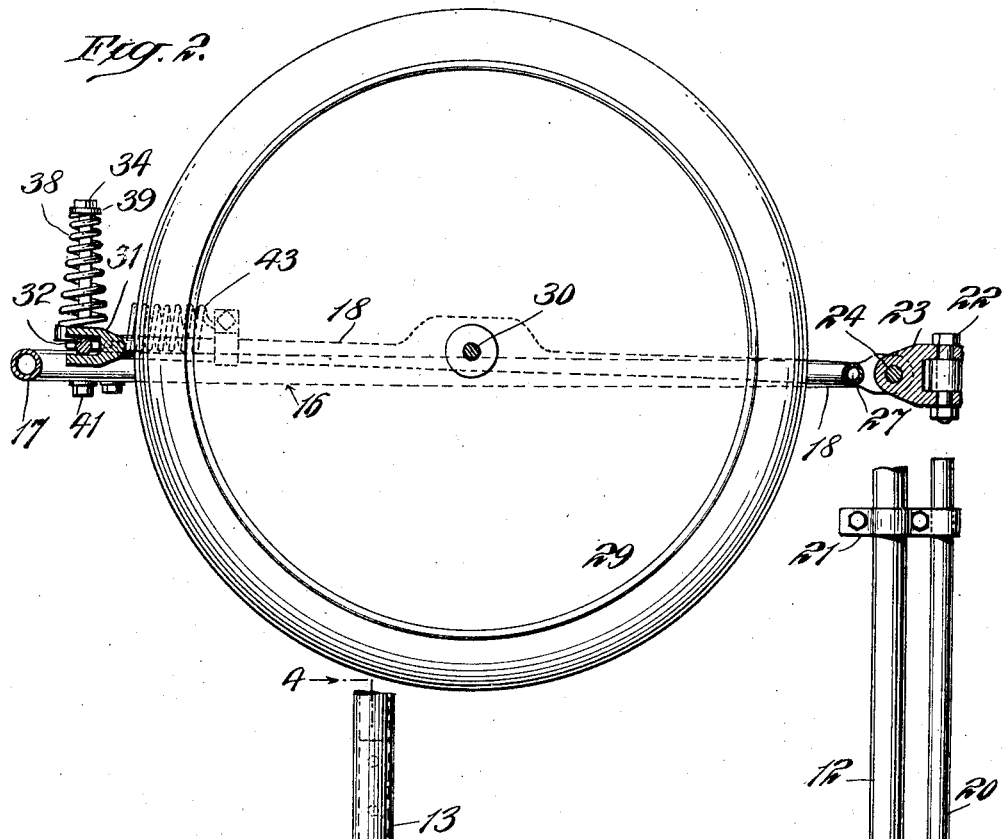

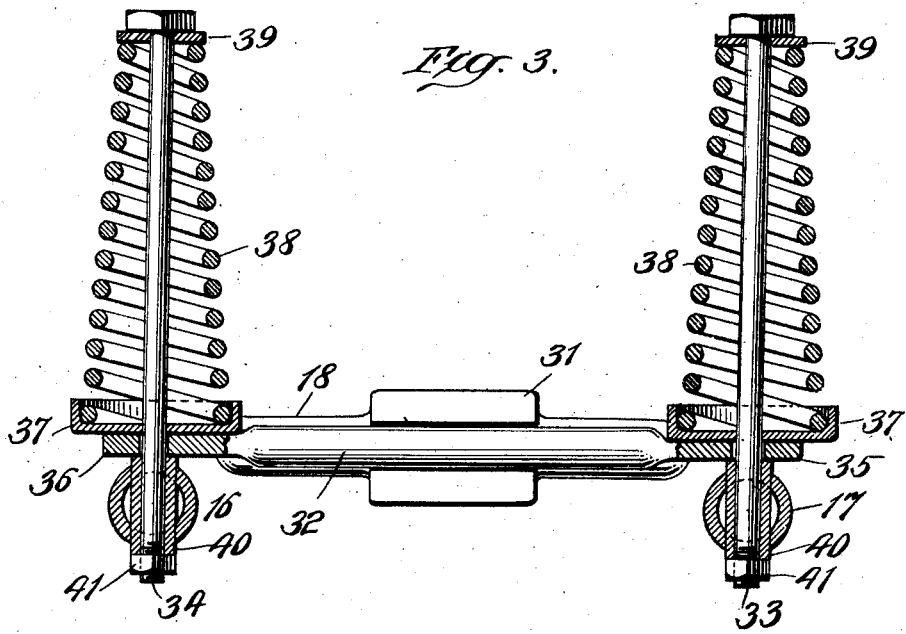

JOHN ODELL JOHNSTON, OF NEWARK, NEW JERSEY.

MOTORCYCLE.

1,332,042.  Specification of Letters Patent.  Patented Feb. 24, 1920.

Application filed April 29, 1918. Serial No. 231,568.

*To all whom it may concern:*

Be it known that I, JOHN ODELL JOHNSTON, a citizen of the United States, and a resident of Newark, in the county of Essex and State of New Jersey, have invented certain new and useful Improvements in Motorcycles, of which the following is a specification.

The invention pertains more particularly to novel means for supporting, guiding and cushioning the supporting wheel connected with the chassis for the side-car of a motorcycle, and it consists in the novel features hereinafter described, and particularly pointed out in the claims.

My invention comprises, in combination with the wheel for the side-car, a novel yoke or frame in which said wheel is journaled, a second frame partly inclosing said yoke and having means for connecting it with the chassis for the side-car, means coöperating with the yoke for permitting the same and the wheel therein to yield vertically and laterally and means whereby shocks which would otherwise reach the occupant of the side-car, are absorbed, thereby rendering riding in the side-car comfortable and free from the inconveniences which have heretofore resulted to the occupants of side-cars from excessive jolting.

One object of my invention is to provide means, independent of the chassis, for absorbing the shocks occasioned by the side wheel going over uneven surfaces, and a further purpose of the invention is to provide a wheel-mounting which will render the cycle as a whole more convenient and comfortable of use. The invention comprising the frames and side-car wheel are capable of application to the chassis frames at present in use, and hence may be attached to motorcycles already in use and on the market in substitution for the ordinary wheels used for the side-cars of these cycles.

My invention will be fully understood from the detailed description hereinafter presented, reference being had to the accompanying drawings, in which:

Figure 1 is a top view, partly broken away, of the chassis for a side-car for motorcycles equipped with the features connected with the supporting-wheel constituting my invention;

Fig. 2 is a vertical longitudinal section through the same taken on the dotted line 2—2 of Fig. 1;

Fig. 3 is a vertical transverse section through a portion of the same, on a larger scale, taken on the dotted line 3—3 of Fig. 1;

Fig. 4 is a vertical section through a portion of the same, taken on the dotted line 4—4 of Fig. 1;

Fig. 5 is a transverse section through a portion of the same, taken on the dotted line 5—5 of Fig. 4, and Fig. 6 is a transverse section through a portion of the same and the front bar of the chassis frame taken on the dotted line 6—6 of Fig. 1.

In the drawings, 10 designates a portion of the chassis frame for the side car of a motorcycle, this frame being somewhat rectangular in outline and comprising a side bar 11, a front end bar 12 and a tubular rear member or bar 13, which member 13 has heretofore been utilized to receive the axle of the side supporting wheel, but which in accordance with my invention is employed to adjustably receive a rod 14 extending laterally from the longitudinal bar 15 constituting a portion of a frame 16, said frame 16 comprising the aforesaid bar 15 and a curved rear member 17 which curves outwardly and in part aids in the formation of an inclosing frame for an auxiliary frame or yoke 18.

The front end of the bar 15 is secured by a clamp 19 to a laterally extending rod 20 which is secured by clamps 21 to the front bar 12 of the chassis frame. The rod 20 at its outer end is pivotally secured, by a bolt 22, with a bearing block 23 constituting a universal joint connection between the frame 18 and the rod 20, said frame 18 at its front end being pivotally secured by a bolt 24 with the aforesaid block 23. and said bolts 22, 24 being extended at right angles to each other. The block 23 may therefore turn laterally on the pivot 22 and the frame 18 may turn laterally with said block 23 and also vertically in a hinged manner on the pivot bolt 24.

The frame or yoke 18 is an elongated frame comprising side bars 25, 26 and end bars 27, 28, and said frame or yoke 18 horizontally encompasses the supporting wheel 29 and affords bearings for the axle 30 for said wheel. The side-bars 25, 26 extend forwardly beyond the front end bar 27, so as to straddle the block 23 and afford apertured ends to receive the pivot bolt 24. The rear end of the frame 18 is formed with a slotted rearwardly projecting arm 31 which loosely receives a transverse rod 32 whose ends are connected by vertical bolts 33, 34 with the rear portion of the frame 16, as clearly illustrated in Fig. 3. The ends of the rod 32 are flattened out and apertured to form plates 35, 36, and upon these plates are provided cups 37 through which the bolts 33, 34 pass and upon which are confined coiled springs 38, whose lower ends rest within the cups 37 and whose upper ends are engaged by washers 39 located upon the upper ends of the bolts 33, 34 and immediately below the heads thereof, as shown in Fig. 3. The lower portions of the rods 33, 34 extend through vertical sleeves 40 which extend vertically through the member 17 of the frame 16 and are engaged at their lower ends by the nuts 41 on the bolts 33, 34. The transverse bar 32 and cups 37 may yield vertically with the yoke or frame 18 when the wheel 29 is passing over uneven surfaces, and the purpose of the springs 38 is to cushion the shocks due to the wheel 29 passing over uneven surfaces and to prevent the transmission of such shocks to the chassis frame and side car.

I also provide two springs 42, 43 connecting the frames 16, 18, as shown in Fig. 1, the spring 42 being secured at its forward end to the side arm 25 of the yoke or frame 18 and at its rear end to the member 17 of the frame 16. The spring 43 is secured at its front end to the side bar 26 of the yoke or frame 18 and at its rear end to the frame 16. The springs 42, 43 are horizontally disposed and normally act to maintain the yoke or frame 18 parallel with the member 15 of the frame 16 and to restore said yoke or frame 18 to such position of parallelism when, under the conditions of travel, the wheel 29 and yoke or frame 18 are caused to swivel laterally in one direction or the other on the pivot bolt 22. The springs 42, 43 cushion the lateral shocks which may be imparted to the wheel 29 when said wheel is passing over surfaces calculated to create such shocks. The springs 38 and the springs 42, 43 coöperate to absorb all of the shocks which due to conditions of travel may be inaugurated through the wheel 29, and thereby relieve the chassis frame 10 and the side car to be mounted thereon from shocks and the violent tremulous movement to which the car is ordinarily, in motorcycles as heretofore constructed, subjected.

The rod 14 is secured within the tubular member 13 by means of a cotter pin or the like 44, and said rod, which may be a piece of tubing, is provided with a number of vertical holes 45 to receive the key or pin 44, and the tubular member 13 is formed with upper and lower holes with which the respective holes 45 may be alined to receive said pin or key 44, whereby the rod 14 is rendered capable of adjustment laterally with relation to the chassis frame. This lateral adjustment of the rod 14 is desirable, since thereby the frames 16, 18 may be adjusted in a direction from the chassis frame, so that the wheel 29 may, when necessary, be positioned to take the track left by automobiles or wagons. The outer end of the tubular member 13 is split, as shown in Fig. 4, and equipped with clamping ears 46 and a bolt 47, thereby permitting said member 13 to be bound against the rod 14. When the frames 16, 18 are adjusted outwardly, the rod 20 will necessarily be adjusted accordingly, and such adjustment is permitted by the clamps 21.

The features embodying my invention reside in the attachment, comprising the frames 16, 18 and connected parts, for application to the chassis frame of the side car of a motorcycle, as a substitute for the customary wheel connected directly with said chassis frome and in rigid relation thereto. My invention provides for a yielding connection of the wheel and its immediately coöperating parts with the chassis frame, and in this yielding connection of the wheel with the vehicle, means are provided for absorbing the shocks which otherwise in ordinary constructions are transmitted by the wheel to the chassis frame. My invention results in the provision of a comfortable-riding side car for motorcycles. The frame 16 is rigid with the chassis frame, but it is to be observed that the yoke or frame 18 and wheel 29 may yield laterally on the pivot bolt 22 and vertically on the pivot bolt 24 and are controlled in such movements by the springs 38 and springs 42, 43. The member 31 at the rear end of the frame or yoke 18 is in the shape of a fork loosely receiving the transverse rod 32, which fork and rod permit of the proper lateral swiveling of the yoke or frame 18 and also the vertical swiveling of said yoke or frame. The springs 38 cushion the yoke or frame 18 and wheel 29 during the vertical movement thereof, and the springs 42, 43 cushion said yoke or frame and wheel during the lateral swiveling thereof, said springs in each instance serving to return the yoke or frame 18 and wheel 29 to their normal position.

I do not limit my invention to the details of form and arrangement otherwise than the appended claims may require, because I regard my invention as broadly new and of substantial benefit when applied to the side chassis of a motorcycle. I do not illustrate the side car, nor the motorcycle proper, because I make no changes in these features, but substitute my invention for the ordinary side wheel found in motorcycles having side cars.

What I claim as my invention and desire to secure by Letters-Patent, is:

1. For side-car motorcycles, in combination, a chassis frame for the side-car, a rigid frame connected therewith and extending along the side thereof, a road wheel, a yoke-frame receiving said wheel, means pivotally connecting one end of said yoke-frame with said rigid frame and permitting said yoke-frame to yield vertically, a vertically movable rod on which the other end of said yoke-frame is freely mounted, means loosely connecting the ends of said rod with said rigid frame consisting of vertical rods extending through said rigid frame and the ends of said rod, and coiled springs mounted on said vertical rods and bearing on the ends of said rod and tending to hold the same and said yoke-frame in normal position.

2. For side-car motorcycles, in combination, a chassis frame for the side-car, a rigid frame connected therewith and extending along the side thereof, a road wheel, a yoke-frame receiving said wheel, means pivotally connecting one end of said yoke-frame with said rigid frame and permitting said yoke-frame to swivel laterally, a rod on which the other end of said yoke-frame is supported and guided in its lateral movements, and springs connecting said rigid and yoke frames and tending to hold said yoke frame in normal position.

3. For side-car motorcycles, in combination, a chassis frame for the side-car, a rigid frame connected therewith and extending along the side thereof, a road wheel, a yoke-frame receiving said wheel, means pivotally connecting one end of said yoke-frame with said rigid frame and permitting said yoke-frame to swivel laterally, a rod on which the other end of said yoke-frame is supported and guided in its lateral movements, and springs connecting said rigid and yoke frames and tending to hold said yoke frame in normal position, said springs being coiled and secured at their front ends to said yoke frame and thence extended rearwardly on diverging lines and secured at their rear ends to said rigid frame.

4. For side-car motorcycles, in combination, a chassis frame for the side car, a rigid frame connected therewith and extending along the side thereof, a road wheel, a yoke-frame receiving said wheel, means pivotally connecting one end of said yoke-frame with said rigid frame and permitting said yoke-frame to yield vertically and laterally, a vertically movable rod on which the other end of said yoke-frame is freely mounted and guided, means loosely connecting the ends of said rod with said rigid frame, springs engaging said rod and tending to hold the same and the adjacent end of said yoke frame in their normal down position, and side springs connecting said rigid and yoke-frames and tending to hold said yoke-frame and wheel in alined relation to the chassis.

5. For side-car motorcycles, in combination, a chassis frame for the side-car, a rigid frame at the side thereof, means connecting said frames and permitting the adjustment of the rigid frame toward and from the chassis frame, a road wheel, a yoke-frame receiving said wheel, means pivotally connecting one end of said yoke-frame with said rigid frame and permitting said yoke-frame to yield vertically, a vertically movable rod on which the other end of said yoke-frame is freely mounted, means loosely connecting the ends of said rod with said rigid frame, and springs engaging said rod and tending to hold the same and said yoke-frame in normal position.

6. For side-car motorcycles, in combination, a chassis frame for the side-car, a road wheel for the outer side thereof, a frame carrying said wheel and connected with the chassis frame and being pivotally mounted at one end to yield vertically and also swivel laterally, springs acting against the other end of said wheel frame to retain the same and the wheel in their down position, and side springs acting against said wheel frame to retain the same and the wheel in alined relation to the chassis.

7. For side-car motorcycles, in combination, a chassis frame for the side-car, a road wheel for the outer side thereof, a frame carrying said wheel, means connecting said frames and permitting of the adjustment of the wheel frame toward and from the chassis frame, means pivotally mounting the wheel frame at one end to yield vertically and also swivel laterally, springs acting against the other end of said wheel frame to retain the same and the wheel in their down position, and side springs acting against said wheel frame to retain the same and the wheel in alined relation to the chassis.

Signed at New York city, in the county of New York and State of New York, this 22nd day of April, A. D. 1918.

JOHN ODELL JOHNSTON.

Witnesses:
ARTHUR MARION,
CHAS. C. GILL.